United States Patent
Ching-Wen

(10) Patent No.: US 6,860,654 B1
(45) Date of Patent: Mar. 1, 2005

(54) LENS HOLDING STRUCTURE FOR WALL-MOUNTED SURVEILLANCE CAMERA

(75) Inventor: Lin Ching-Wen, Banchian (TW)

(73) Assignee: A-One Optoelectronics, LTD, Taipei (TW)

( * ) Notice: Subject to any disclaimer, the term of this patent is extended or adjusted under 35 U.S.C. 154(b) by 0 days.

(21) Appl. No.: 10/753,028

(22) Filed: Jan. 5, 2004

(51) Int. Cl.[7] .......................... G03B 17/00; H04N 7/18
(52) U.S. Cl. ........................................ 396/427; 348/143
(58) Field of Search ................................. 396/427, 428; 348/143, 151, 375

(56) References Cited

U.S. PATENT DOCUMENTS 6,762,790 B1 * 7/2004 Matko et al. ............... 348/148

2003/0103160 A1 * 6/2003 Tatewaki et al. ............ 348/375

* cited by examiner

Primary Examiner—Judy Nguyen
Assistant Examiner—Arthur A Smith
(74) Attorney, Agent, or Firm—W. Wayne Liauh

(57) ABSTRACT

A lens holding structure for wall-mounted surveillance camera is obtained via improving a basic structure of a conventional ceiling-mounted surveillance camera. The lens holding structure allows a lens of the wall-mounted surveillance camera to turn to any desired direction and be adjusted to any inclination, so that the surveillance camera may not only be directed toward any desired direction for surveillance, but also take an image free of deformation to facilitate effective surveillance by a security guard via a monitor connected to the camera.

1 Claim, 6 Drawing Sheets

LENS HOLDING STRUCTURE FOR WALL-MOUNTED SURVEILLANCE CAMERA

FIELD OF THE INVENTION

The present invention relates to a lens holding structure for wall-mounted surveillance camera, and more particularly to a lens holding structure for surveillance camera that is a modification of a conventional lens holding structure for a ceiling-mounted surveillance camera to allow mounting of the surveillance camera on a wall.

BACKGROUND OF THE INVENTION

Surveillance and monitoring systems have been widely employed in many different places to watch over entrance and exit of people and goods thereat to ensure the safety of the general public. Basic apparatuses included in surveillance and monitoring systems are surveillance cameras and monitors electrically connected to a main control unit. Images taken by each surveillance camera are sent to the main control unit and displayed on the monitors for viewing by security guards.

The surveillance cameras may appear in many different forms, and may be generally divided into two types according to the mounting manners: surveillance camera with mounting rack and surveillance camera without mounting rack. The latter may be further divided into a ceiling-mounted and a wall-mounted type. FIG. 1 shows a conventional ceiling-mounted surveillance camera, which includes a base 10, a revolving seat 11, a lens carrier 12, and a lens 13. The lens 13 is fixedly connected to the lens carrier 12, and the lens carrier 12 is locked at two opposite sides to the revolving seat 11 using two clamp screws 14, 15. The revolving seat 11 is screwed to the base 10 and adapted to turn relative to the base 10 within a range without separating from the base 10. The lens 13 must be so positioned that an image of an upright person or object taken by the lens 13 may be displayed on the monitors in a normal state, that is, in the same upright condition. By turning the revolving seat 11 toward a desired direction, the lens 13 may be aimed at an area to be watched over, so that the purpose of surveillance is achieved. A clear hood 16 is connected to a top of the base 10 to protectively enclose the other components therein.

When the above-structured ceiling-mounted surveillance camera is directly mounted to a wall surface, any turning of the revolving seat 11 would result in deformation of the image taken by the lens 13. The deformed image shown on the monitors stops the security guards from quickly and correctly judging the actual state in the surveillance area from the monitors.

Currently, there are many wall-mounted surveillance cameras available in the market. Basically, these wall-mounted cameras must have a lens fixedly aimed at a desired direction without being turned, in order to take images free of any deformation.

FIG. 2 shows a conventional wall-mounted surveillance camera, which has a base 20, a pair of mounting lugs 21 provided in the base 20, a first swing seat 22 angle-adjustably mounted on the mounting lugs 21, a second swing seat 23 angle-adjustably mounted on the first swing seat 22, a lens 24 fixedly mounted on the second swing seat 23, and a hood 25 connected to a top of the base 20. The first and the second swing seat 22, 23 swing in two orthogonal directions, so that the lens 24 may be aimed at any desired direction. However, the base 20 and the hood 25 must be large enough to provide a sufficient space between them for mounting the first and the second swing seat 22, 23 therein. Therefore, the wall-mounted surveillance camera of FIG. 2 has a relatively large volume and is quite noticeable when it is mounted on the wall.

SUMMARY OF THE INVENTION

A primary object of the present invention is to modify the conventional lens holding structure of a ceiling-mounted surveillance camera, so as to provide a lens holding structure suitable for a wall-mounted surveillance camera.

To achieve the above and other objects, the lens holding structure for wall-mounted surveillance camera according to the present invention includes a lens carrier that may be freely turned and inclined to enable adjustment of an image taken by the camera to a normal state without deformation and accordingly ensures correct surveillance via the camera.

The lens holding structure for wall-mounted surveillance camera according to the present invention mainly includes a base, a revolving seat, a fixing ring, a lens carrier, and a lens. The lens is fixedly mounted on the lens carrier, and the latter is upward extended through the fixing ring to turnably locate therein using three adjusting screws. The fixing ring is connected to the revolving seat via two opposite clamp screws, and the revolving seat is rotatably screwed to the base. By adjusting the position of the lens carrier, the surveillance camera may take images that are not deformed.

The lens carrier includes an annular groove provided on an outer peripheral wall. The three adjusting screws are extended through the fixing ring into the annular groove, so that the lens carrier is securely located in the fixing ring without the risk of separating therefrom.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
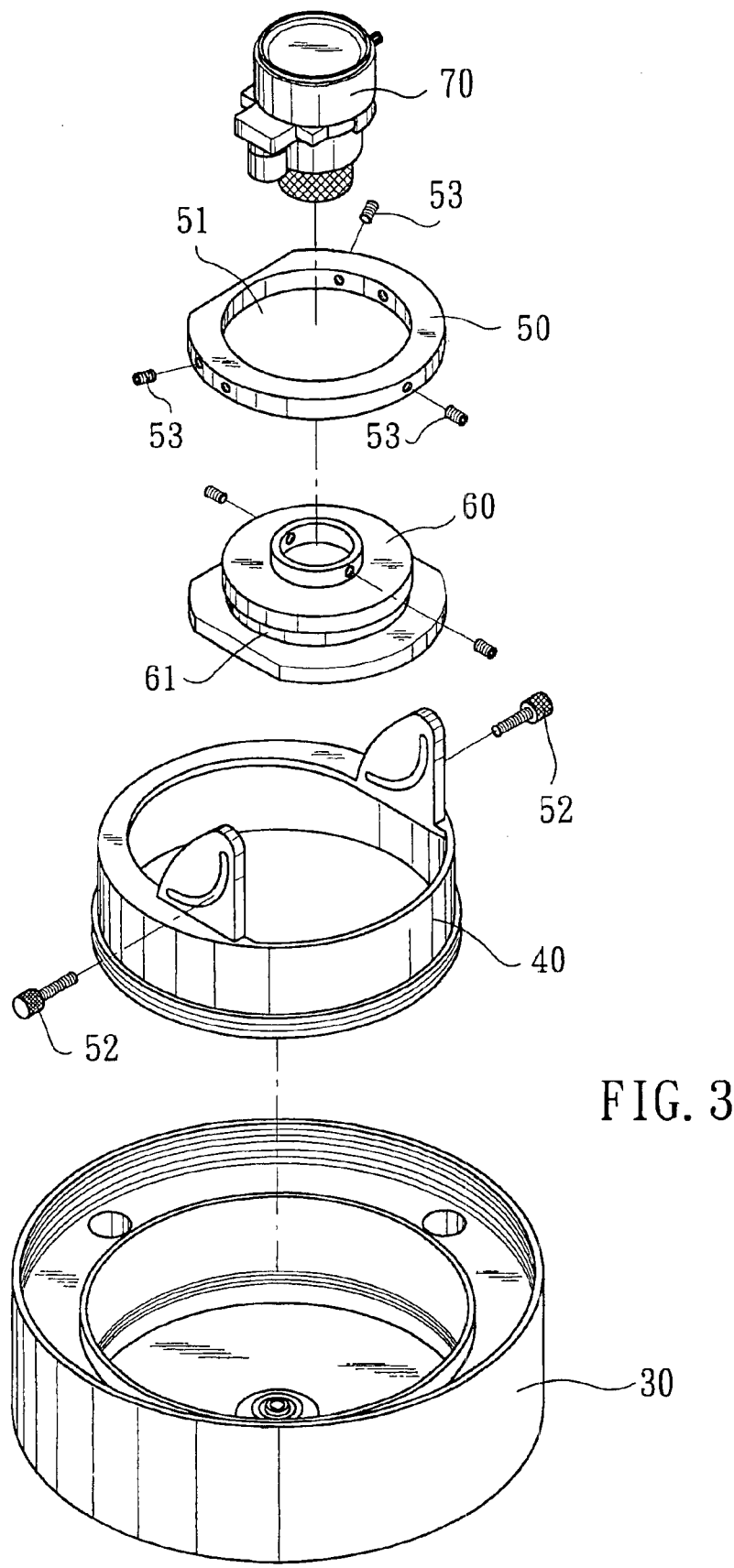
FIG. 3 is an exploded perspective view of the present invention.
Figure 4:
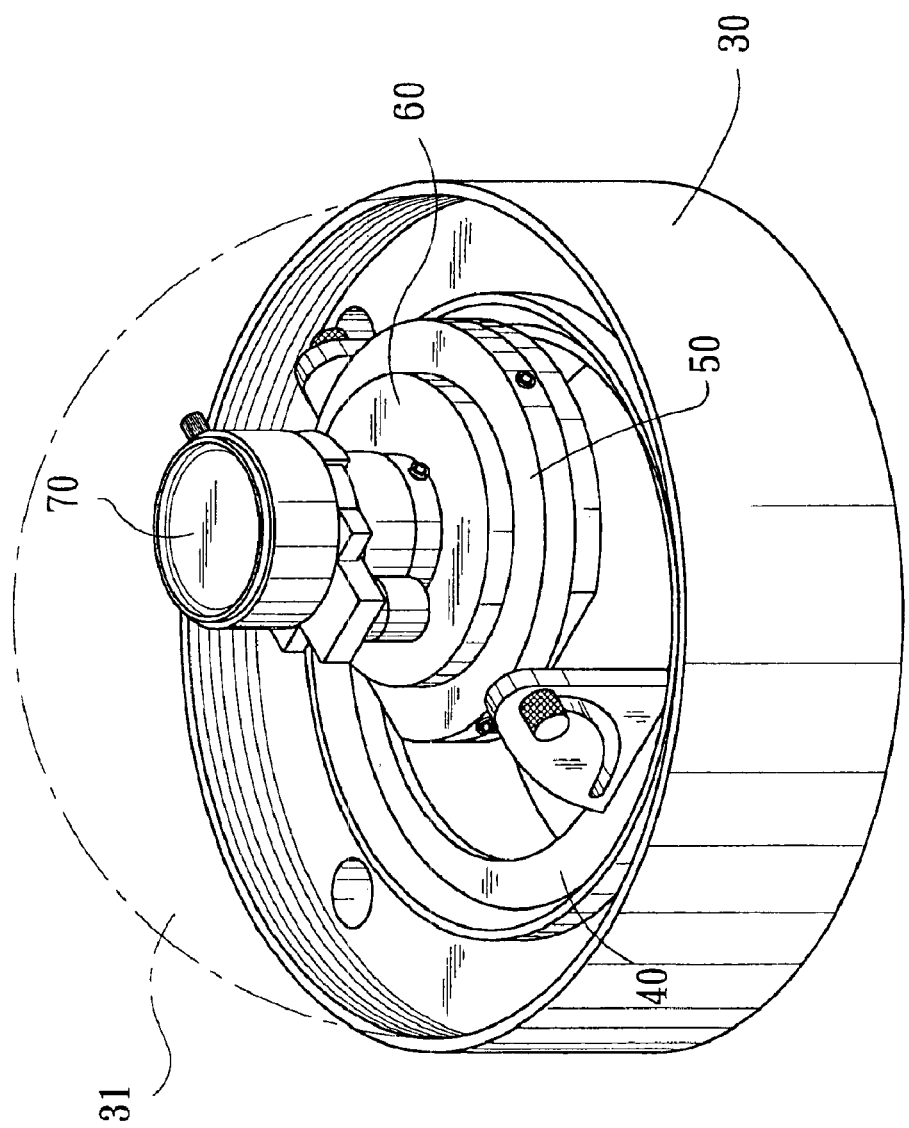
FIG. 4 is an assembled perspective view of the present invention.

Please refer to FIGS. 3 and 4 that are exploded and assembled perspective views, respectively, of a lens holding structure for wall-mounted surveillance camera according to the present invention. As shown, the present invention mainly includes a base 30, a revolving seat 40, a fixing ring 50, a lens carrier 60, a lens 70, and a hood 31.

Figure 5:
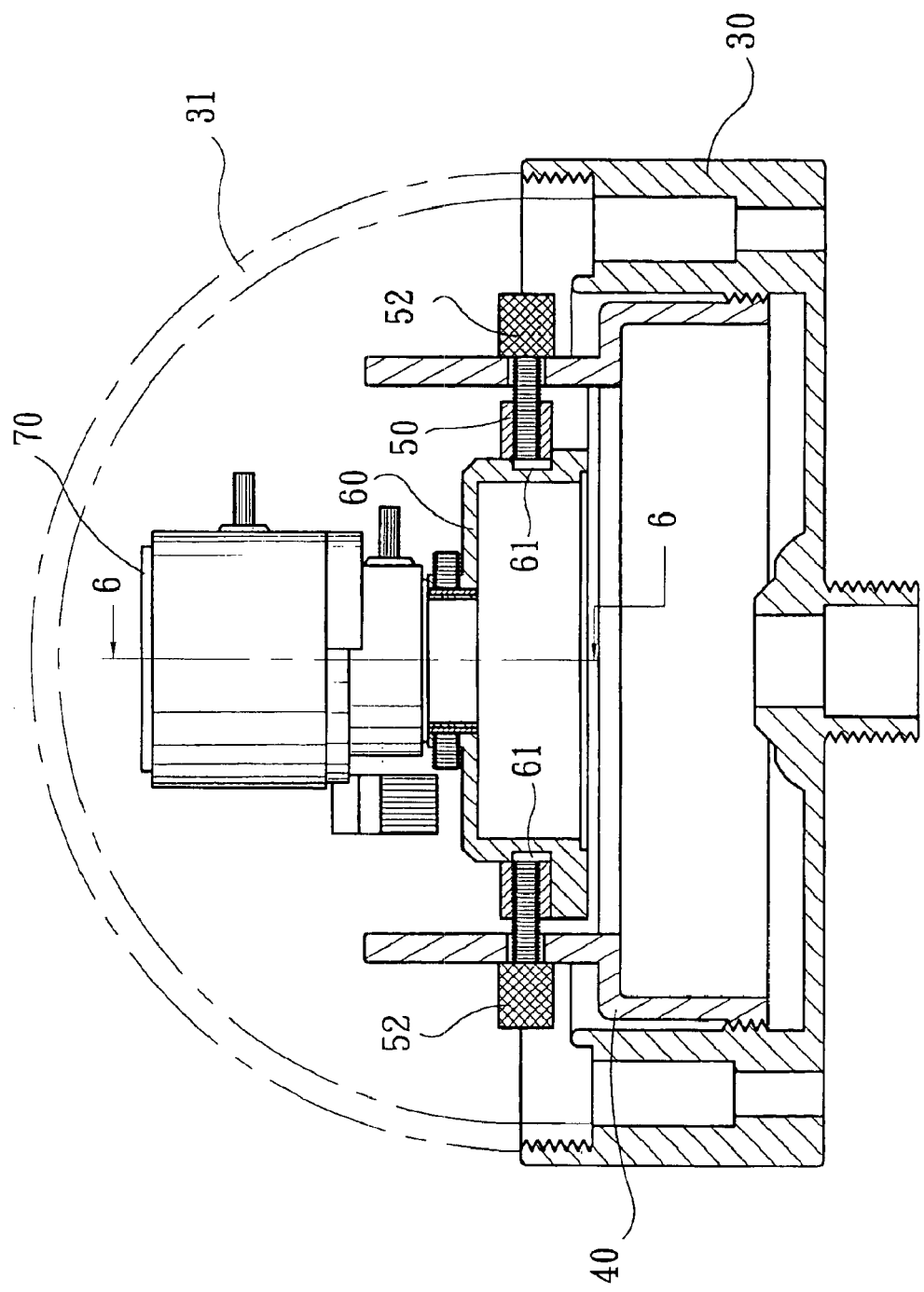
FIG. 5 is a sectioned side view of FIG. 4.
Figure 6:
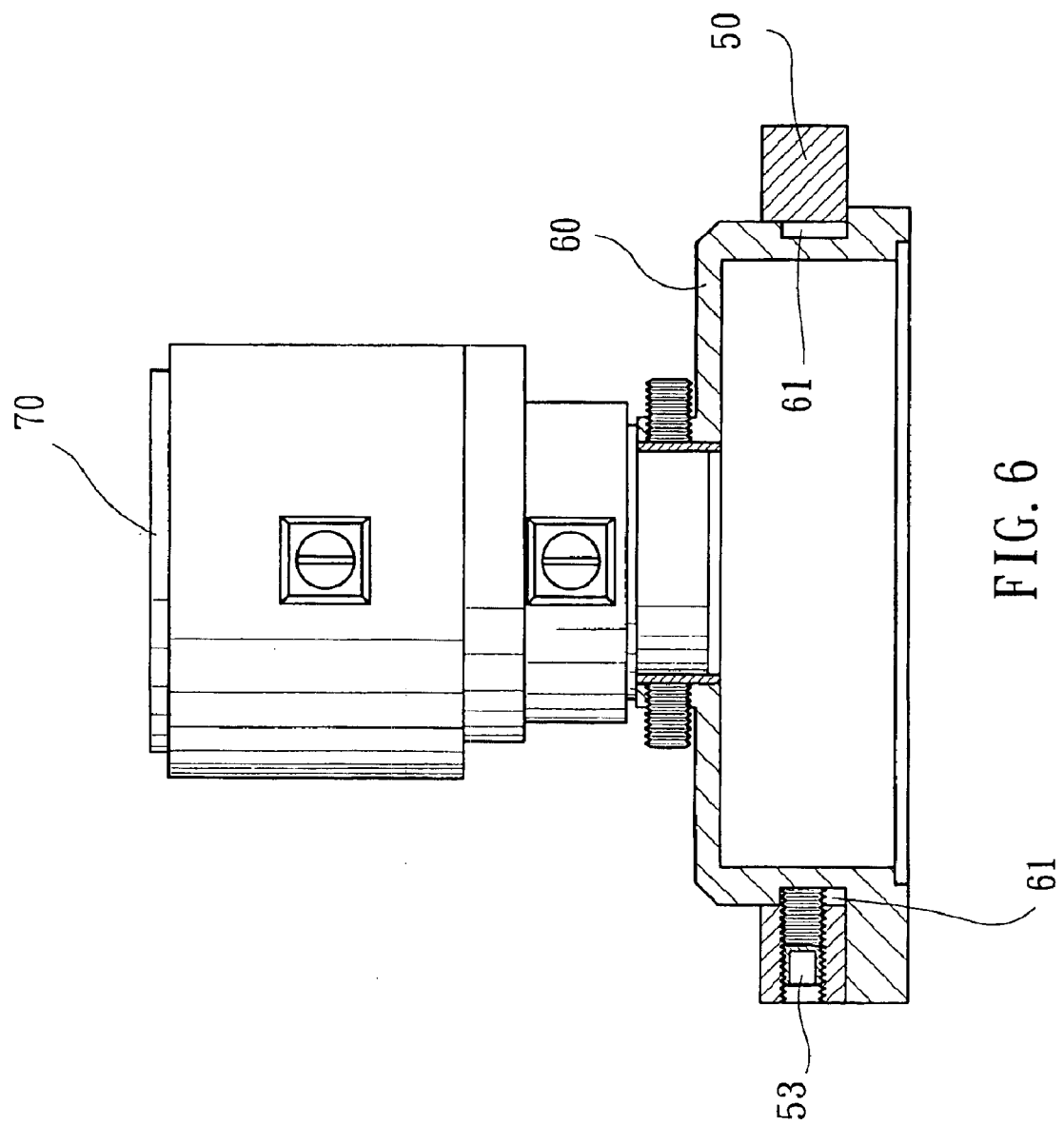
FIG. 6 is a sectional view taken along line 6—6 of FIG. 5.

Please also refer to FIG. 5 that is a sectioned side view of the present invention in an assembled state. The revolving seat 40 is screwed to the base 30 and adapted to rotate relative to the base 30, and the lens 70 is connected to the lens carrier 60. The fixing ring 50 is an annular member defining a round opening 51 at a central portion thereof, and is located in and connected to the revolving seat 40 via two opposite clamp screws 52. The lens carrier 60 has an upper part extended through the round opening 51 of the fixing ring 50, and is provided along an outer peripheral wall of the upper part with an annular groove 61, which is invisibly located at an inner side of the fixing ring 50. As can be seen from FIGS. 3 and 6, the lens carrier 60 is prevented from separating from the fixing ring 50 by radially extending three equally spaced adjusting screws 53 through the fixing ring 50 into the annular groove 61. When the three adjusting screws 53 are fully tightened against the lens carrier 60, the latter is firmly fixed in place in the round opening 51 of the fixing ring 50.

The base 30 is adapted to mount on a wall surface using screws (not shown). By turning the revolving seat 40 relative to the base 30, and adjusting an inclination of the fixing ring 50 relative to the revolving seat 40, it is possible to direct the lens 70 toward any desired direction to cover a desired surveillance area. Then, before the adjusting screws 53 are fully tightened against the lens carrier 60, the latter may be turned relative to the fixing ring 50 until an image taken by the lens 70 is in a normal state, that is, without any deformation. Finally, the adjusting screws 53 are tightened to fix the adjusted lens carrier 60 in place and complete the installation of the surveillance camera.

A surveillance camera having the above-described lens holding structure is characterized in that the lens 70 is rotatably adjustable to take an image in a desired direction. To enable the lens 70 to aim at any direction for desired surveillance, the surveillance camera must be able to always allow adjusting of an inclination of the lens 70, and rotating of the revolving seat 40. Since the fixing ring 50 may be pivotally turned about the clamp screws 52 relative to the revolving seat 40, the lens 70 is allowed to change its inclination. Meanwhile, since the revolving seat 40 may be rotated relative to the base 30, the lens 70 could be adjusted to aim at any direction.

When the lens 70 is able to take an image in the normal state before the revolving seat 40 has been rotated, any rotation of the revolving seat 40 would result in deformation of the image taken by the lens 70. However, by turning the lens carrier 60, it is still possible to restore the deformed image to the normal state. It is noted the lens carrier 60 and the revolving seat 40 are turned by the same angle but in two opposite directions during adjusting the lens 70.

Figure 1:
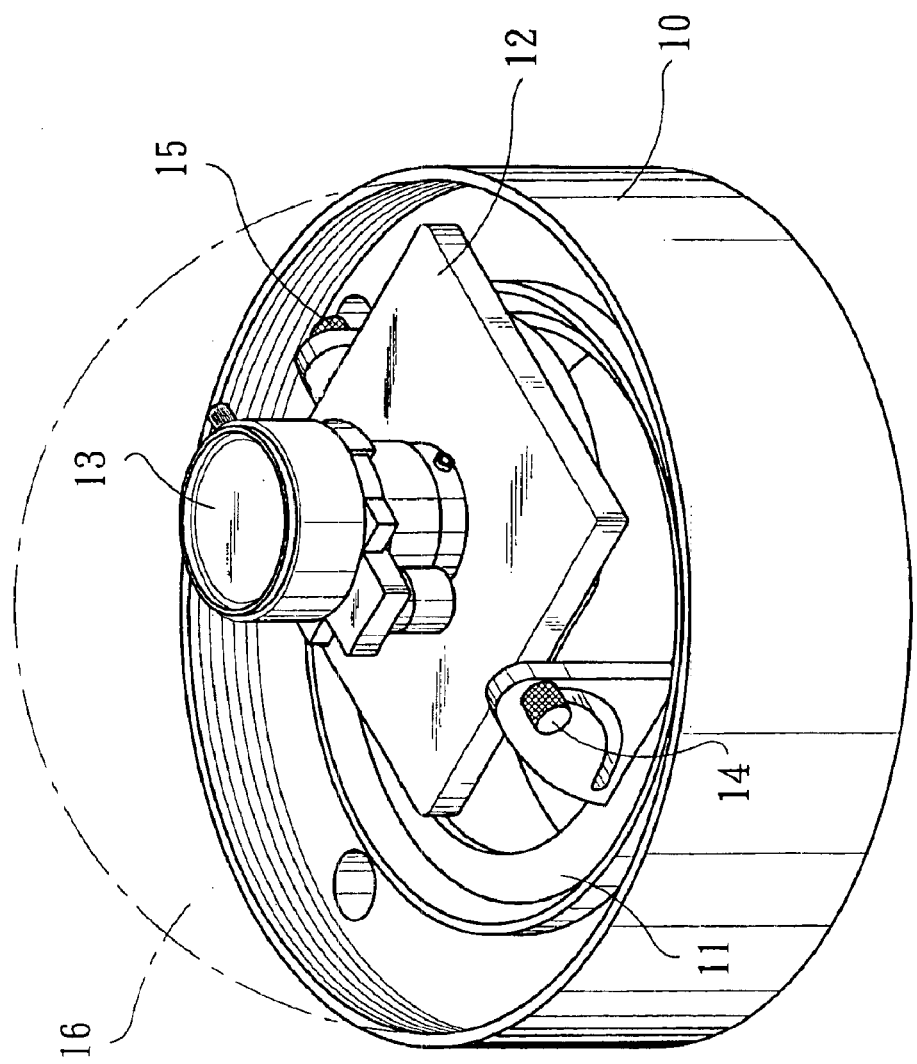
FIG. 1 is a perspective view of a conventional ceiling-mounted surveillance camera.
Figure 2:
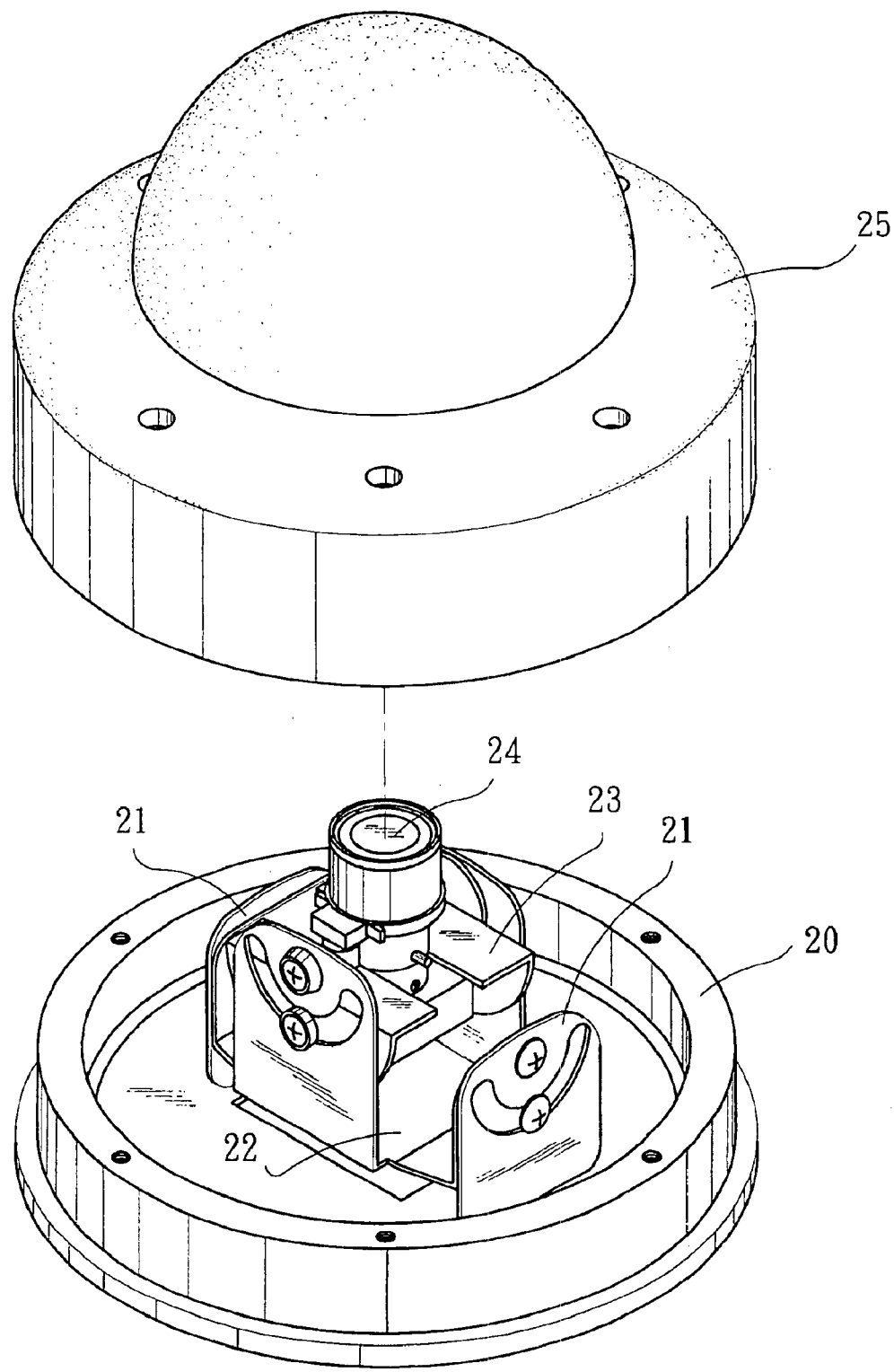
FIG. 2 is a partially exploded perspective view of a conventional wall-mounted surveillance camera.

The wall-mounted surveillance camera having the above-described lens holding structure may have an overall volume similar to that of the conventional ceiling-mounted surveillance camera shown in FIG. 1, and smaller than that of the general commercially available wall-mounted surveillance camera as shown in FIG. 2. Therefore, the surveillance camera of the present invention is not so noticeable after it is mounted on the wall. Moreover, the wall-mounted surveillance camera of the present invention has a base 30 and a revolving seat 40 similar to that of the ceiling-mounted surveillance camera, and may therefore be manufactured with simplified process and at reduced cost, which advantageously increases the surveillance camera's competition ability in the market.

What is claimed is:

1. A lens holding structure for wall-mounted surveillance camera, comprising a base, a revolving seat, a fixing ring, a lens carrier, a lens, and a hood; said revolving seat being screwed to said base and being adapted to turn relative to said base; said lens being fixedly mounted on said lens carrier; and said hood being connected to a top of said base; said lens holding structure for wall-mounted surveillance camera being characterized in that said fixing ring is an annular member defining a round opening at a central portion thereof and located in and connected to said revolving seat via two opposite clamp screws, that said lens carrier has an upper part extended through said round opening of said fixing ring and is provided along an outer peripheral wall of said upper part with an annular groove, which is invisibly located at an inner side of said fixing ring, and that said lens carrier is prevented from separating from said fixing ring by radially extending three equally spaced adjusting screws through said fixing ring into said annular groove, and that said lens carrier is firmly fixed in place in said round opening of said fixing ring when said three adjusting screws are fully tightened against said annular groove.

* * * * *